United States Patent Office 3,558,752
Patented Jan. 26, 1971

3,558,752
FOAMED RESINS PRODUCTION
Durgacharan Sen, Cwmbran, England, assignor to Monsanto Chemicals Limited, London, England, a British company
No Drawing. Continuation-in-part of application Ser. No. 679,545, Oct. 31, 1967. This application Nov. 21, 1968, Ser. No. 777,875
Claims priority, application Great Britain, Nov. 1, 1966, 48,833/66
Int. Cl. B29d 27/00; C08f 47/10
U.S. Cl. 264—51                7 Claims

ABSTRACT OF THE DISCLOSURE

A process for preparing foamed thermoplastic resins having a fine, uniform cell size by extruding into a zone of lower pressure a heat-softened foamable thermoplastic resin containing a volatile blowing agent under pressure and a nucleating agent comprising orthoboric acid. The nucleating agent preferably also comprises a wax or a finely-divided inert solid such as silica or talc.

CROSS-REFERENCE TO RELATED APPLICATION

This application is a continuation-in-part of copending application S.N. 679,545, filed Oct. 31, 1967, and now abandoned.

BACKGROUND OF THE INVENTION

Field of the invention

This invention relates to the production of foamed thermoplastic resins and more particularly relates to a process for producing foamed thermoplastic resins by the extrustion of a resin composition comprising a volatile blowing agent and a nucleating agent.

Description of the prior art

It has previously been proposed to produce foamed resins by extrusion, but a disadvantage of such proposals has been that there have been difficulties in the production of foams having a fine and uniform cell size. Nucleating agents consisting of finely-divided solid particles have been proposed as additives to the resin to provide sites at which cells can be produced by expansion of the blowing agent. However, previously proposed nucleating agents have attendant disadvantages. For example, it has been found that when finely-divided silica is used as the nucleating agent it is often necessary to include an antioxidant, and the resultant foamed resin may have a tendency to discolor, particularly in the presence of strong sunlight. Furthermore, silica has not been found to have as good a nucleating effect as is desirable, and a further improvement in this respect would be valuable.

SUMMARY OF THE INVENTION

An object of the invention is to provide foamed thermoplastic resins having excellent uniformity and fineness of cell size.

Another object is to provide an extrusion process for preparing such foamed thermoplastic resins.

These and other objects are attained by employing orthoboric acid as a nucleating agent in a process wherein a heat-softened foamable thermoplastic resin containing a volatile blowing agent and a nucleating agent is extruded into a zone of lower pressure to permit foaming of the resin. In the process the orthoboric acid does not react with other substances, but the extrusion conditions are such that it undergoes thermal decomposition, presumably to metaboric acid and water, to provide nucleation sites for cell formation. Often the orthoboric acid is used as the sole nucleating agent. However, in a preferred embodiment of the invention, a wax or a finely-divided inert solid such as silica or talc is used as an additional nucleating agent to give foamed resins having a particularly fine cell size.

DESCRIPTION OF THE PREFERRED EMBODIMENTS

The following examples are given to illustrate the invention and are not intended as a limitation thereof. Unless otherwise specified, quantities mentioned in the examples are quantities by weight. Average cell sizes disclosed in these examples are determined by (1) cutting several thin slices, conveniently cross sections, at intervals along the extruded foam strip and smearing one side of each slice with ink, (2) mounting each slice on a microscope and measuring the total area of 10 adjoining cells in one place on the slice by the method of least squares, (3) repeating the procedure at four different places on the surface of each slice and using the measurements to calculate the average area of the cells of the slice, and hence their average diameter, and (4) calculating the average value for the cell diameter of the whole strip from the average values calculated for the cells of each slice.

EXAMPLE I

Part A

Dry blend 2 pounds of orthoboric acid with 98 pounds of polyethylene granules having a melt index of 2.0 grams/10 minutes and a density of 0.921 gram per cc. Feed the granules into the hopper of a screw extruder having a barrel with a nominal diameter of 1.5 inches, and inject butane under pressure into the molten mixture in the extruder barrel to give a foamable composition containing 10% by weight of butane. Extrude the foamable composition at a rate of about 100 grams per minute through a slit die having a length of 0.75 inch, a width of 0.035 inch, and a die temperature of 145° C. (The pressure at the entrance to the die being 400 p.s.i.) to form a strip of foamed polyethylene. The foamed polyethylene strip has a density of about 2.4 pounds per cubic foot and a very fine cell structure, the average cell diameter being 0.34 mm.

Part B—Control

Repeat Part A except for using 2% of finely-divided silica as the nucleating agent instead of orthoboric acid. The average cell diameter of the foamed polyethylene strip is 1.4 mm.

Part C—Control

Repeat Part A except for using a mixture of 1% of boric acid and 1% of sodium bicarbonate as the nucleating agent instead of 2% of orthoboric acid. The extruded board has a mixture of fine and coarse cells and also contains occasional large cavities 3 to 4 mm. across and several cm. long in the direction of extrusion.

EXAMPLE II

Part A

Repeat Example I—Part A except for using a mixture of 1 pound of orthoboric acid and 1 pound of talc as the nucleating agent. The extruded board has an extremely fine cell structure, the average cell diameter being 0.20 mm.

Part B—Control

Repeat Part A except for using 2% of talc as the sole nucleating agent. The average cell diameter of the extruded foamed board is 0.41 mm.

EXAMPLE III

Part A

Dry blend 1 pound of orthoboric acid with 99 pounds of polyethylene granules having a melt index of 2.0 grams/10 minutes and a density of 0.921 gram per cc. Feed the granules into the hopper of a screw extruder having a barrel with a nominal diameter of 1.5 inches, and inject nitrogen under pressure into the molten mixture in the extruder to give a foamable composition. Extrude the foamable composition at a rate of about 100 grams per minute through a slit die having a length of 6 inches, a width of 0.035 inch, and a die temperature of 145° C. (the pressure at the entrance to the die being 400 p.s.i.) to form a fine-celled foamed polyethylene board having a density of 25 pounds per cubic foot and a thickness of 0.65 inch. The density of the extruded foamed board can be varied by varying the amount of nitrogen injected.

Part B—Control

Repeat Part A except for using silica as the nucleating agent instead of orthoboric acid. The board has a much greater cell size.

Part C—Control

Repeat Part A except for using a mixture of 1% of boric acid and 1% of sodium bicarbonate as the nucleating agent. Variable results are obtained, with the cells being fine for a few minutes of extruder running time and then suddenly and unpredictably becoming very coarse.

EXAMPLE IV

Dry blend a mixture of 1 pound of orthoboric acid and 1 pound of talc with 98 pounds of polyethylene granules having a melt index of 2.0 grams/10 minutes and a density of 0.921 gram per cc. Feed the granules into the hopper of an extruder having a barrel with a nominal diameter of 1.5 inches. At an extruder speed of 80 revolutions per minute, extrude the mixture through a slit die having a length of 6 inches and a width of 0.030 inch, using nitrogen as the blowing agent. The product is a fine-celled foamed board having a density of about 27 pounds per cubic foot.

EXAMPLE V

Part A

Repeat Example IV except for (1) substituting an ethylene-vinyl acetate (87.5/12.5) copolymer for the polyethylene, (2) using an extruder speed of 60 revolutions per minute, and (3) using a slit die having a length of 6 inches and a width of 0.025 inch. The product is a fine-celled foamed board having a density of about 26 pounds per cubic foot.

Part B—Control

Repeat Part A except for using silica as the nucleating agent. The product has a noticeably coarser cell structure.

EXAMPLE VI

Repeat Example III—Part A except for using a tube die having a diameter of 2.5 inches and blowing out the extruded film with compressed air. The product is a fine-celled opaque film having a density of about 20 pounds per cubic foot.

EXAMPLE VII

Repeat Example IV except for using a tube die having a diameter of 2.5 inches and blowing out the extruded film with compressed air. The product is a very fine-celled opaque film having a density of about 20 pounds per cubic foot and a quality superior to that of the product of Example VI.

EXAMPLE VIII

Repeat Example VII except for using a mixture of only 0.5% orthoboric acid and 0.5% talc as the nucleating agent. The product is a very good quality foamed opaque film having a density of about 20 pounds per cubic foot.

EXAMPLE IX

Dry blend 0.5 pound of orthoboric acid with 99.5 pounds of polystyrene granules. Feed the granules into the hopper of a screw extruder having a barrel with a nominal diameter of 1.5 inches, and inject butane under pressure into the molten mixture (which is at temperature of 175° C.) in the extruder barrel to give a foamable composition containing 10% by weight of butane. Extrude the foamable composition through a slit die having a length of 0.75 inch, a width of 0.035 inch, and a die temperature of 130° C. to form a strip of foamed polystyrene. The foamed polystyrene strip has a fine uniform cell structure, the average cell diameter being 0.19 mm.

EXAMPLE X

Dry blend a mixture of 0.5 pound of orthoboric acid and 0.25 pound of an ethylene-bis-stearamide wax (sold under the trademark Abril Wax Iods) with 99.25 pounds of polyethylene granules having a melt index of 2.0 grams/10 minutes and a density of 0.921 gram per cc. Feed the granules into the hopper of a screw extruder having a barrel with a nominal diameter of 1.5 inches, and inject butane under pressure into the molten mixture in the extruder barrel to give a foamable composition containing 11% by weight of butane. At an extruder speed of 40 revolutions per minute, giving a throughput of about 100 grams per minute, extrude the foamable composition through a slit die having a length of 0.75 inch, a width of 0.035 inch, and a die temperature of 97° C. The product is a fine-celled foamed polyethylene strip having a density of about 2.3 pounds per cubic foot and an average cell diameter of 0.33 mm. The density can be varied by varying the amount of butane injected.

EXAMPLE XI

Repeat Example X except for using 98.75 pounds of polyethylene, 1 pound of orthoboric acid, and 0.25 pound of an ethylene-bis-stearamide (sold under the trademark Acrawax "C"). The product is a fine-celled foamed polyethylene strip having a density of about 2.3 pounds per cubic foot and an average cell diameter of 0.21 mm. The density can be varied by varying the amount of butane injected.

EXAMPLE XII

Dry blend a mixture of 1 pound of orthoboric acid and 0.25 pound of an ethylene-bis-stearamide (Acrawax "C") with 98.75 pound of polyethylene granules having a melt index of 2.0 grams/10 minutes and a density of 0.921 gram per cc. Feed the granules into the hopper of an extruder having a barrel with a nominal diameter of 1.5 inches. At an extruder speed of 80 revolutions per minute, giving a throughput of about 200 grams per minute, extrude the mixture through a slit dies having a length of 6 inches and a width of 0.030 inch, using nitrogen injected into the extruder barrel as a blowing agent.

The product is a fine-celled foamed board having a density of about 26 pounds per cubic foot. The density can be varied by varying the amount of nitrogen injected.

EXAMPLE XIII

Dry blend a mixture of 1 pound of orthoboric acid, 1 pound of talc, and 0.5 pound of an ethylene-bis-stearamide (Acrawax "C") with 97.5 pounds of polyethylene granules having a melt index of 2.0 grams/10 minutes and a density of 0.921 gram per cc. Feed the granules into the hopper of an extruder having a barrel with a nominal diameter of 1.5 inches. Extrude the mixture at a screw speed of 40 revolutions per minute through a tube die having a diameter of 2.5 inches, using nitrogen injected into the extruder barrel as a blowing agent. Blow out the resultant foam with air to produce a thin opaque foam film having an exceptionally fine cell structure and a density of about 20 pounds per cubic foot. The density can be varied widely by varying the amount of blowing agent injected.

The orthoboric acid employed as a nucleating agent in the practice of the invention is preferably used in a finely-divided particulate form, the particles usually being less than 60 B.S.S. mesh, particularly 120–300 B.S.S. mesh, e.g., about 200 B.S.S. mesh. As mentioned above, the orthoboric acid can be used as the sole nucleating agent, or it can be used in conjunction with an additional nucleating agent which can be a wax or a finely-divided inert solid such as silica or talc. When a wax is employed as an additional nucleating agent, it is preferably a wax having a softening point higher than that of the resin, usually at least 10° C. higher, e.g., 20–100° C. higher, than the resin softening point. The wax is preferably microcrystalline in nature and can be, e.g., a hydrocarbon or ester wax or an amide or alcohol of high molecular weight. Preferably the molecular weight of the wax is more than 400, e.g., 500–1000. A wax that is particularly suitable for use in the extrusion of foamed polyethylene is ethylene-bis-stearamide, which softens at about 140° C.

The orthoboric acid and any additional nucleating agent can be conveniently mixed with the resin by dry-blending particles of resin and nucleating agent in a conical mixer, although any other suitable method can be used. A small proportion of orthoboric acid by weight of the resin, e.g., up to 5% by weight of the resin, is normally sufficient to provide good nucleation. Smaller quantities, e.g., 0.5–3% by weight of the resin can be used with advantage, and particularly good results can be obtained when using about 2% orthoboric acid by weight of the resin. Generally, less orthoboric acid, e.g., about 1% by weight, is needed when an additional nucleating agent is employed. When the nucleating agent comprises a mixture of orthoboric acid and an additional nucleating agent such as a wax or a finely-divided inert solid such as talc, good results are obtained employing substantially equal proportions by weight of orthoboric acid and the additional nucleating agent, although greater or lesser proportions of one or the other can be used if desired. For example, it is often convenient for the weight of the additional nucleating agent to be about half, e.g., 25–75%, that of the orthoboric acid.

The thermoplastic resin is preferably a polymer or copolymer of a vinyl or vinylidene monomer, e.g., a hydrocarbon monomer such as ethylene, propylene, butadiene, styrene, vinyl toluene, or alpha-methylstyrene or a substituted monomer such as acrylonitrile, vinyl chloride, vinyl acetate, methyl acrylate, methyl methacrylate, ethyl acrylate, etc. It is particularly preferred to employ a polymer of an olefinic monomer containing up to four carbon atoms, and excellent results are obtained using polyethylene or polypropylene.

In the process, the foamable resin contains a volatile blowing agent. In many instances the blowing agent is one that is a gas or vapor under normal atmospheric conditions (such as 20° C. and 1 atmosphere pressure) but which, while under pressure before extrusion, is present in solution in the molten or semimolten thermoplastic resin. However, the blowing agent can be one, such as pentane or a pentane fraction, which is a liquid under normal conditions. Exemplary of volatile blowing agents that can be used are lower aliphatic hydrocarbons (i.e., those containing up to five carbon atoms) such as methane, ethane, ethylene, propane, a butane, a butylene, or a pentane; lower alkyl halides such as methyl chloride, methylene chloride, trichloromethane, or fluorocarbons such as 1,2-dichlorotetrafluoroethane; acetone, and inorganic gases such as carbon dioxide or nitrogen. A mixture of two or more volatile blowing agents can be used if desired. The lower aliphatic hydrocarbons, especially butane, are preferred.

A suitable proportion of blowing agent is often 1–20%, especially 5–15%, based on the weight of the resin. For example, the use of 8–13% by weight of butane in conjunction with polyethylene gives excellent results. When a screw-type extruder is used, a convenient method of introducing the blowing agent into the resin in the injection of the blowing agent under pressure into the extruder barrel so that the blowing agent is thoroughly mixed with the resin before extrusion takes place.

Generally, the temperature of the resin in the mixing zone (i.e., the zone where the resin is mixed with the blowing agent) is above 100° C., particularly between 120 and 200° C., e.g., 150° C. At these temperatures thermal decomposition of the orthoboric acid begins to take place and is preferably substantially complete before the resin reaches the extrusion die.

The extrusion temperature (i.e., the temperature of the die and the resin within it) depends to some extent on the softening point and rheological properties of the resin, but in general temperatures between 70° C. and 170° C., e.g., 80–160° C., preferably 80–145° C., are suitable. For example, when foamable polyethylene is being extruded, a temperature in the range of 90° C. to 140° C. or 150° C. is often very suitable.

The extrusion pressure (i.e., the pressure at the entrance to the die) is often greater than 250 p.s.i., especially between 250 and 5000 p.s.i. Preferably, the pressure is between 300 and 2000 p.s.i.

Extrusion takes place into a zone of lower pressure, which is normally the open atmosphere. The extruded foamed resin is preferably supported in some way until it has cooled, e.g., by means of a roller or a moving-belt takeoff device, or by passing it over a flat plate or between two plates.

It is obvious that many variations can be made in the products and processes set forth above without departing from the spirit and scope of this invention.

What is claimed is:

1. In a process for preparing a foamed thermoplastic polyolefin resin by extruding a composition comprising:

(a) a heat-softened foamable thermoplastic resin consisting essentially of a polymer of an olefinic monomer containing up to four carbon atoms,
(b) a volatile blowing agent under pressure, and
(c) a nucleating agent into a zone of lower pressure to permit foaming of the resin, the improvement which comprises employing a nucleating agent selected from the group consisting of orthoboric acid alone or in combination with 25–75% by weight, based on the weight of the orthoboric acid, of at least one additional nucleating agent selected from the group consisting of finely divided talc and wax and employing extrusion conditions such that the orthoboric acid decomposes to provide nucleating sites for cell formation.

2. The process of claim 1 wherein the volatile blowing agent under pressure is injected into a mixture of the heat-softened thermoplastic resin and the nucleating agent in a zone where the temperature of the resin is 120–200° C.

3. The process of claim 1 wherein the proportion of nucleating agent is 0.5–3%, based on the weight of the resin.

4. The process of claim 1 wherein the orthoboric acid has a particle size of 120–300 B.S.S. mesh.

5. The process of claim 1 wherein the wax is an amide having a molecular weight of 500–1000.

6. The process of claim 5 wherein the wax is ethylene-bis-stearamide.

7. The process of claim 1 wherein the thermoplastic resin is polyethylene.

References Cited

UNITED STATES PATENTS

| | | | |
|---|---|---|---|
| 2,911,382 | 11/1959 | Barkhuff et al. | 260—2.5(E) |
| 2,941,965 | 6/1960 | Ingram | 260—2.5(E) |
| 3,072,584 | 1/1963 | Karpovich | 260—2.5(E) |

W. J. BRIGGS, SR., Examiner

U.S. Cl. X.R.

260—2.5, 28.5, 87.3, 88.1, 93.5, 93.7, 94.9; 264—53, 211